(12) United States Patent
Kitano

(10) Patent No.: US 11,067,689 B2
(45) Date of Patent: Jul. 20, 2021

(54) INFORMATION PROCESSING DEVICE, INFORMATION PROCESSING METHOD AND PROGRAM

(71) Applicant: PIONEER CORPORATION, Tokyo (JP)

(72) Inventor: Kazutoshi Kitano, Kanagawa (JP)

(73) Assignee: PIONEER CORPORATION, Tokyo (JP)

( * ) Notice: Subject to any disclaimer, the term of this patent is extended or adjusted under 35 U.S.C. 154(b) by 306 days.

(21) Appl. No.: 15/759,825

(22) PCT Filed: Oct. 6, 2015

(86) PCT No.: PCT/JP2015/078343
§ 371 (c)(1),
(2) Date: Mar. 13, 2018

(87) PCT Pub. No.: WO2017/060977
PCT Pub. Date: Apr. 13, 2017

(65) Prior Publication Data
US 2018/0252812 A1    Sep. 6, 2018

(51) Int. Cl.
*G01S 17/04*      (2020.01)
*G01S 7/481*      (2006.01)
(Continued)

(52) U.S. Cl.
CPC .............. *G01S 17/04* (2020.01); *G01S 7/481* (2013.01); *G01S 7/484* (2013.01); *G01S 7/4817* (2013.01);
(Continued)

(58) Field of Classification Search
CPC ........ G01S 17/04; G01S 17/931; G01S 7/481; G01S 7/4817; G01S 17/10; G01S 17/42; G01S 17/87; G01S 17/89
See application file for complete search history.

(56) References Cited

U.S. PATENT DOCUMENTS 5,808,728 A    9/1998  Uehara
6,055,042 A    4/2000  Sarangapani
(Continued)

FOREIGN PATENT DOCUMENTS

JP    7-77578 A     3/1995
JP    H0848198 A    2/1996
(Continued)

OTHER PUBLICATIONS

International Search Report for related PCT Application No. PCT/JP2015/078343 dated Dec. 28, 2015; 6 pages.
(Continued)

*Primary Examiner* — Elias Desta
(74) *Attorney, Agent, or Firm* — Procopio, Cory, Hargreaves & Savitch LLP

(57) ABSTRACT

The information processing device includes a plurality of light transmission/reception units and an information processing unit. Each of the light transmission/reception unit includes an emission unit which emits a light, a scanning unit which scans the light emitted by the emission unit, and a light receiving unit which receives the light reflected by an object. The information processing unit obtains at least one of a distance to the object and an angle of the object based on light receiving results of the light receiving units. Each of the scanning units is arranged at a position where there is a direction in which the light scanned by the scanning unit is blocked by a vehicle itself, and scans the light omnidirectionally in a horizontal direction in a manner shared by the scanning units.

7 Claims, 19 Drawing Sheets

(51) Int. Cl.
*G01S 17/87* (2020.01)
*G01S 17/89* (2020.01)
*G01S 17/42* (2006.01)
*G01S 17/931* (2020.01)
*G01S 7/484* (2006.01)
*G01S 17/10* (2020.01)

(52) U.S. Cl.
CPC .............. *G01S 17/10* (2013.01); *G01S 17/42* (2013.01); *G01S 17/87* (2013.01); *G01S 17/89* (2013.01); *G01S 17/931* (2020.01)

(56) References Cited

U.S. PATENT DOCUMENTS

| | | | |
|---|---|---|---|
| 6,151,539 | A | 11/2000 | Bergholz et al. |
| 8,436,763 | B2 * | 5/2013 | Wintermantel ......... G01S 7/032 342/70 |
| 8,473,144 | B1 | 6/2013 | Dolgov et al. |
| 8,549,318 | B2 * | 10/2013 | White .................. B60K 28/063 701/1 |
| 9,046,599 | B2 | 6/2015 | Morikawa et al. |
| 2014/0062759 | A1 | 3/2014 | Morikawa et al. |
| 2014/0121880 | A1 | 5/2014 | Dolgov et al. |
| 2014/0297094 | A1 | 10/2014 | Dolgov et al. |
| 2014/0350836 | A1 | 11/2014 | Stettner et al. |
| 2015/0009485 | A1 | 1/2015 | Mheen et al. |
| 2015/0029487 | A1 | 1/2015 | Nakajima et al. |
| 2015/0192677 | A1 | 7/2015 | Yu et al. |
| 2015/0202939 | A1 | 7/2015 | Stettner et al. |
| 2015/0258990 | A1 | 9/2015 | Stettner et al. |
| 2015/0331113 | A1 | 11/2015 | Stettner et al. |
| 2018/0056993 | A1 | 3/2018 | Stettner et al. |

FOREIGN PATENT DOCUMENTS

| | | |
|---|---|---|
| JP | 8-122060 A | 5/1996 |
| JP | 2000-321350 A | 11/2000 |
| JP | 2014-52274 A | 3/2014 |
| JP | 2014-89691 A | 5/2014 |
| JP | 2014-174176 A | 9/2014 |
| JP | 2015-25770 A | 2/2015 |
| JP | 2015-55606 A | 3/2015 |
| JP | 2015-76352 A | 4/2015 |

OTHER PUBLICATIONS

Extended European Search Report for related EP App No. 15905797.5 dated Mar. 21, 2019, 8 pgs.

* cited by examiner

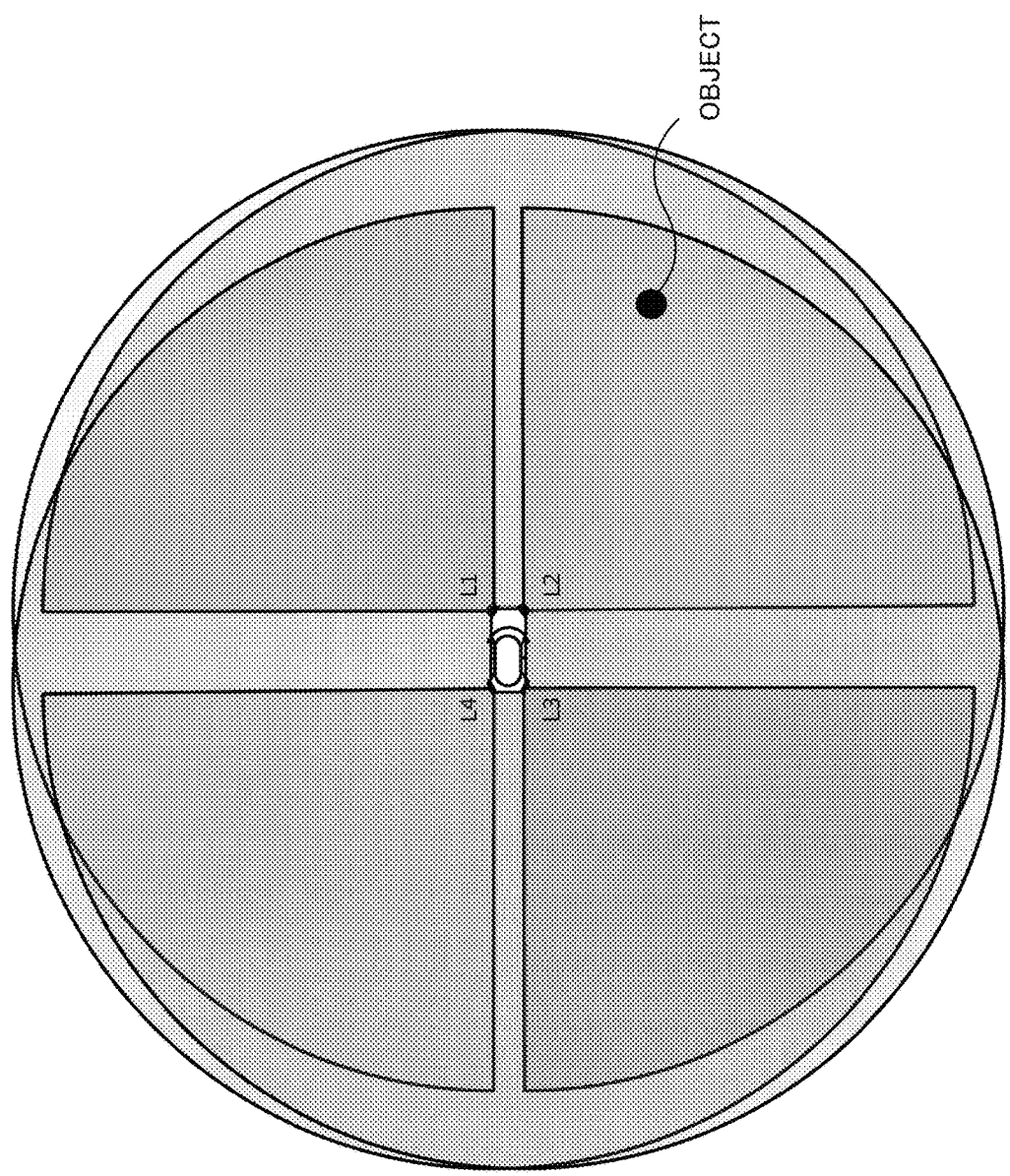

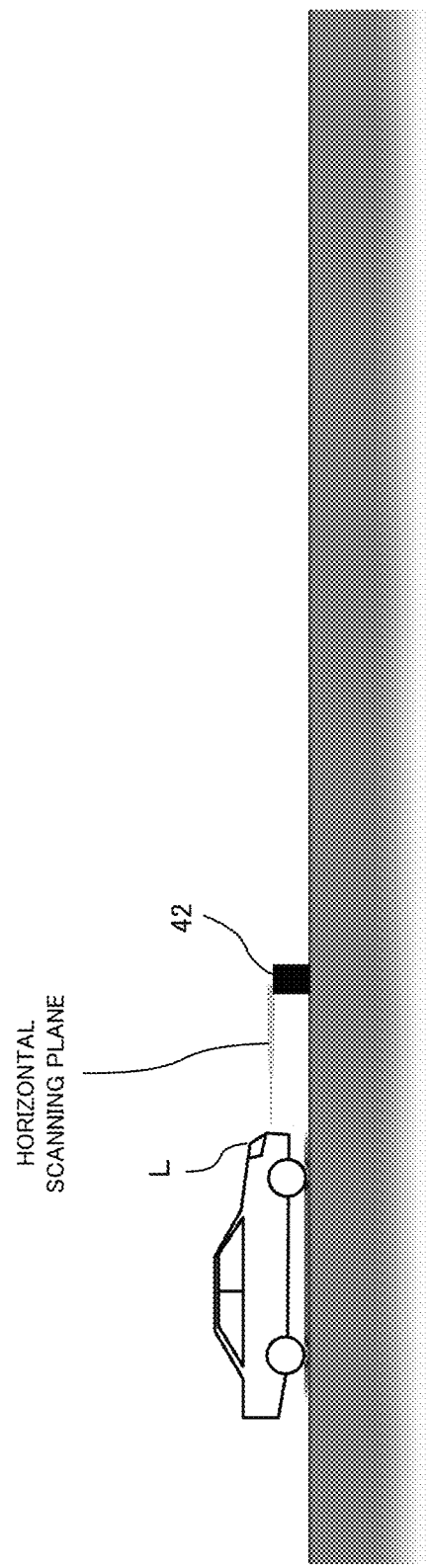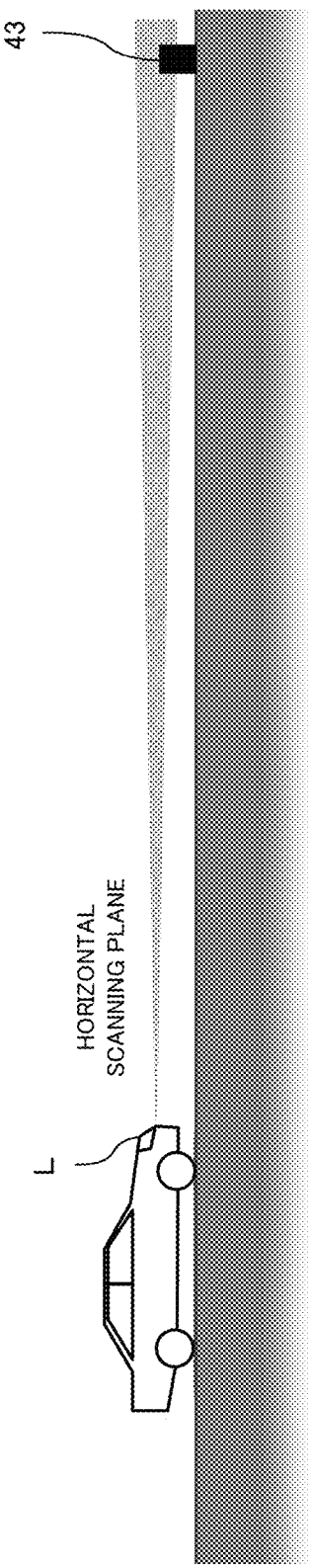

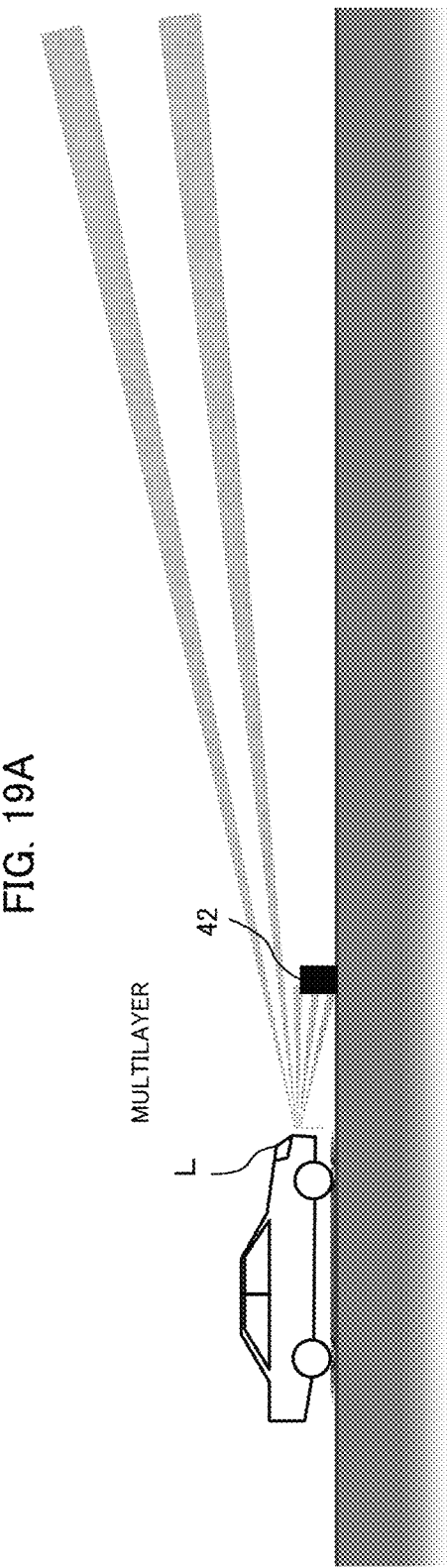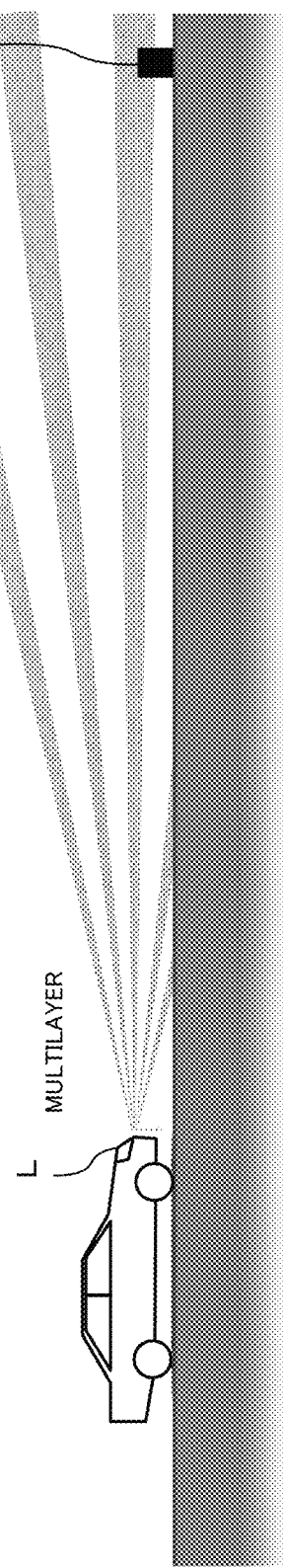

INFORMATION PROCESSING DEVICE, INFORMATION PROCESSING METHOD AND PROGRAM

CROSS-REFERENCE TO RELATED APPLICATIONS

This application is a U.S. National Stage entry of PCT Application No: PCT/JP2015/078343 filed Oct. 6, 2015, the contents of which are incorporated herein by reference.

TECHNICAL FIELD

The present invention relates to a technique of measuring a distance.

BACKGROUND TECHNIQUE

There is known a LIDAR which scans a horizontal direction while intermittently emitting a laser light, and detects point groups on a surface of an object by receiving reflected lights. Patent Reference 1 discloses a technique of scanning surroundings one-dimensionally or two-dimensionally by a LIDAR loaded on a vehicle to detect information on a situation surrounding the vehicle. Patent Reference 2 discloses incorporating laser radars in headlight units of a vehicle.

PRIOR ART REFERENCES

Patent References

Patent Reference 1: Japanese Patent Application laid-Open under No. 2014-89691
Patent Reference 2: Japanese Patent Application laid-Open under No. 2015-76352

SUMMARY OF THE INVENTION

Problem to be Solved by the Invention

As disclosed in Patent Reference 1 (see. FIG. 2), a Lidar is generally mounted on a high position of a vehicle. In that case, however, it is not possible to obtain information existing at a low position of the vehicle. Meanwhile, Patent Reference 2 discloses an example in which a laser radar is installed in each of two headlight units of the vehicle. However, in this case, it is not possible to obtain information in an omnidirection (particularly in the rear direction) due to existence of the vehicle body.

The above is an example of the problem to be solved by the present invention. It is an object of the present invention to provide an information processing device capable of obtaining information of objects existing at a low position in an omnidirection.

Means for Solving the Problem

An invention described in claims is an information processing device comprising: a plurality of light transmission/reception units each including an emission unit configured to emit a light, a scanning unit configured to scan the light emitted by the emission unit, and a light receiving unit configured to receive the light reflected by an object; and an information processing unit configured to obtain at least one of a distance to the object and an angle of the object based on light receiving results of the light receiving units, wherein each of the scanning units is arranged at a position where there is a direction in which the light scanned by the scanning unit is blocked by a vehicle itself, and scans the light omnidirectionally in a horizontal direction in a manner shared by the scanning units.

Another invention described in claims is an information processing method executed by an information processing device comprising a plurality of light transmission/reception units each including an emission unit, a scanning unit and a light receiving unit, the method comprising: a transmission/reception process executing, by each of the plurality of light transmission/reception units, an emission process emitting a light from the emission unit, a scanning process scanning the light emitted by the emission unit by the scanning unit and a light receiving process receiving the light reflected by an object by the light receiving unit; and an information processing process obtaining at least one of a distance to the object and an angle of the object based on light receiving results of the light receiving processes, wherein each of the scanning units is arranged at a position where there is a direction in which the light scanned by the scanning unit is blocked by a vehicle itself, and wherein the scanning process scans the light omnidirectionally in a horizontal direction in a manner shared by the scanning units.

Another invention described in claims is a program executed by an information processing device comprising a plurality of light transmission/reception units each including an emission unit, a scanning unit and a light receiving unit; and a computer, the program causing the computer to execute: a transmission/reception process executing, by each of the plurality of light transmission/reception unit, an emission process emitting a light from the emission unit, a scanning process scanning the light emitted by the emission unit by the scanning unit and a light receiving process receiving the light reflected by an object by the light receiving unit; and an information processing process obtaining at least one of a distance to the object and an angle of the object based on light receiving results of the light receiving processes, wherein each of the scanning units is arranged at a position where there is a direction in which the light scanned by the scanning unit is blocked by a vehicle itself, and wherein the scanning process scans the light omnidirectionally in a horizontal direction in a manner shared by the scanning units.

Another invention described in claims is an information processing device comprising: a plurality of light transmission/reception units arranged at a first position on a vehicle and a second position different from the first position on the vehicle, each of the light transmission/reception units including (i) an emission unit configured to emit a light, (ii) a scanning unit configured to scan the light emitted by the emission unit, and (iii) a light receiving unit configured to receive the light reflected by an object; and an information processing unit configured to perform synthesizing processing of synthesizing light receiving results of the light receiving units of the plurality of light transmission/reception units to obtain at least one of a distance to an object and an angle of the object.

BRIEF DESCRIPTION OF THE DRAWINGS

FIG. 16 illustrates scanning areas of the plurality of scanning units in the second embodiment.

FIGS. 18A and 18B illustrate manners of detecting an object by the embodiments.

FIGS. 19A and 19B illustrate manners of detecting an object by a modified example.

DETAILED DESCRIPTION OF THE PREFERRED EMBODIMENTS

Figure 1:
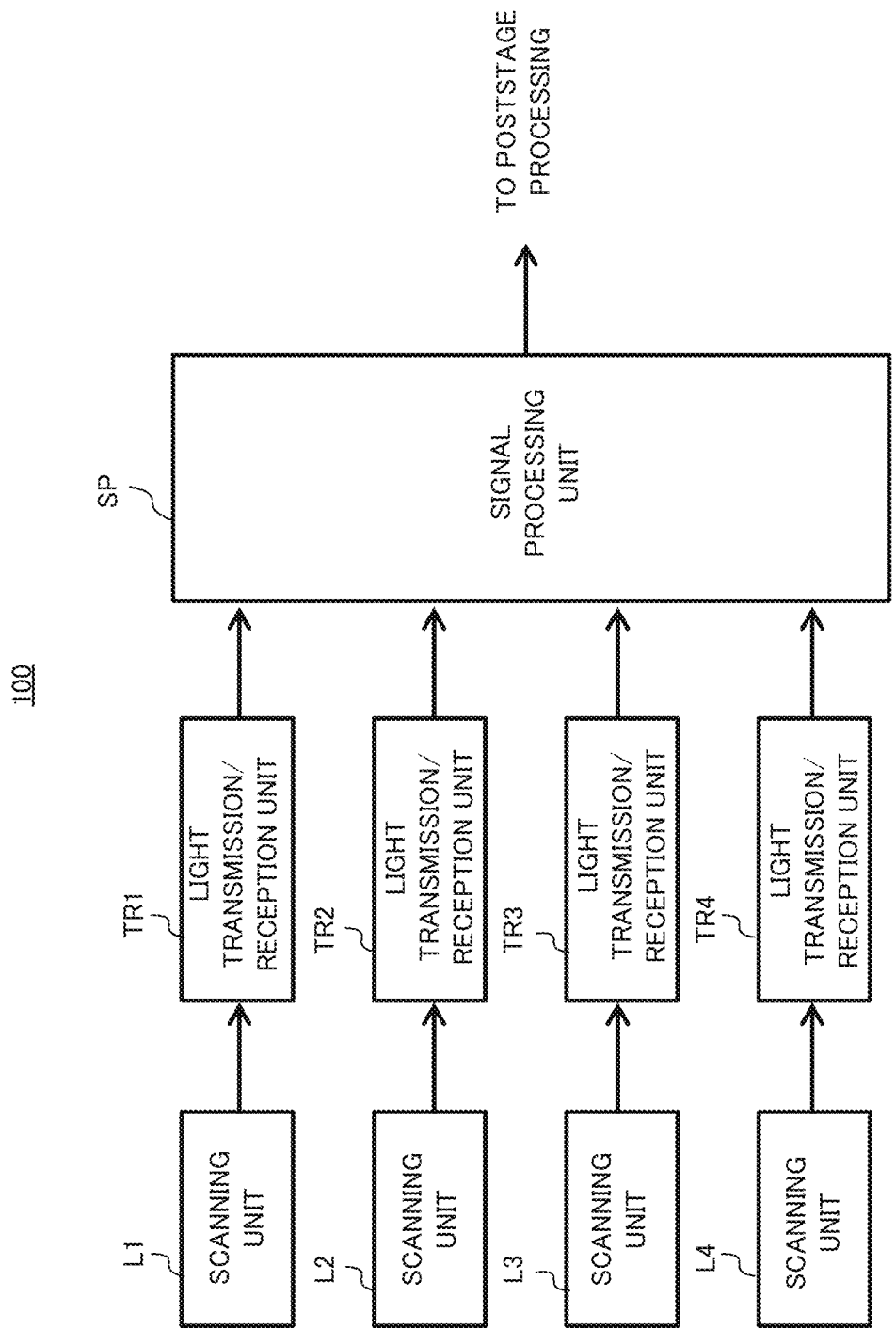
FIG. 1 is a block diagram illustrating a configuration of a Lidar unit according to embodiments.

According to one aspect of the present invention, there is provided an information processing device comprising: a plurality of light transmission/reception units each including an emission unit configured to emit a light, a scanning unit configured to scan the light emitted by the emission unit, and a light receiving unit configured to receive the light reflected by an object; and an information processing unit configured to obtain at least one of a distance to the object and an angle of the object based on light receiving results of the light receiving units, wherein each of the scanning units is arranged at a position where there is a direction in which the light scanned by the scanning unit is blocked by a vehicle itself, and scans the light omnidirectionally in a horizontal direction in a manner shared by the scanning units.

The above information processing device includes a plurality of light transmission/reception units and an information processing unit. Each of the light transmission/reception unit includes an emission unit configured to emit a light, a scanning unit configured to scan the light emitted by the emission unit, and a light receiving unit configured to receive the light reflected by an object. The information processing unit is configured to obtain at least one of a distance to the object and an angle of the object based on light receiving results of the light receiving units. Each of the scanning units is arranged at a position where there is a direction in which the light scanned by the scanning unit is blocked by a vehicle itself, and scans the light omnidirectionally in a horizontal direction in a manner shared by the scanning units. It is noted that "omnidirection" means not only 360° without any dead angle, but a case where a dead angle of several angle exists. According to this information processing device, it is possible to detect objects existing in the omnidirectional and horizontal direction by the plurality of scanning units and thereby obtain surrounding environment information.

In one mode of the above information processing device, the information processing unit converts the light receiving results of the light receiving units of the plurality of light transmission/reception units to converted information on a basis of a predetermined position of the vehicle, respectively, and performs synthesizing processing of synthesizing each of the converted information. In this mode, by synthesizing the light receiving results of the plurality of light transmission/reception units, the omnidirectional surrounding environment information can be obtained.

In another mode of the information processing device, the information processing unit performs averaging processing of the light receiving results of the light receiving units of the plurality of light transmission/reception units for an overlapped range where scanning ranges of the plurality of light transmission/reception units overlap. In this mode, noise components in the light receiving results can be reduced by the averaging processing.

In a preferred embodiment, a number of the plurality of light transmission/reception units is four, and the plurality of light transmission/reception units are arranged in light units of the vehicle.

According to another aspect of the present invention, there is provided an information processing method executed by an information processing device comprising a plurality of light transmission/reception units each including an emission unit, a scanning unit and a light receiving unit, the method comprising: a transmission/reception process executing, by each of the plurality of light transmission/reception units, an emission process emitting a light from the emission unit, a scanning process scanning the light emitted by the emission unit by the scanning unit and a light receiving process receiving the light reflected by an object by the light receiving unit; and an information processing process obtaining at least one of a distance to the object and an angle of the object based on light receiving results of the light receiving processes, wherein each of the scanning units are arranged at a position where there is a direction in which the light scanned by the scanning unit is blocked by a vehicle itself, and wherein the scanning process scans the light omnidirectionally in a horizontal direction in a manner shared by the scanning units. According to this information processing method, it is possible to detect objects existing in the omnidirectional and horizontal direction by the plurality of scanning units and thereby obtain surrounding environment information.

According to still another aspect of the present invention, there is provided a program executed by an information processing device comprising a plurality of light transmission/reception units each including an emission unit, a scanning unit and a light receiving unit; and a computer, the program causing the computer to execute: a transmission/reception process executing, by each of the plurality of light transmission/reception unit, an emission process emitting a light from the emission unit, a scanning process scanning the light emitted by the emission unit by the scanning unit and a light receiving process receiving the light reflected by an object by the light receiving unit; and an information processing process obtaining at least one of a distance to the object and an angle of the object based on light receiving results of the light receiving processes, wherein each of the scanning units are arranged at a position where there is a direction in which the light scanned by the scanning unit is blocked by a vehicle itself, and wherein the scanning process scans the light omnidirectionally in a horizontal direction in a manner shared by the scanning units. By executing this program by a computer, it is possible to detect objects existing in the omnidirectional and horizontal direction by the plurality of scanning units and thereby obtain surrounding environment information. The above program may be stored in a storage medium.

According to still another aspect of the present invention, there is provided an information processing device comprising: a plurality of light transmission/reception units arranged at a first position on a vehicle and a second position different from the first position on the vehicle, each of the light transmission/reception units including (i) an emission unit configured to emit a light, (ii) a scanning unit configured to scan the light emitted by the emission unit, and (iii) a light receiving unit configured to receive the light reflected by an object; and an information processing unit configured to perform synthesizing processing of synthesizing light receiving results of the light receiving units of the plurality of light transmission/reception units to obtain at least one of a distance to an object and an angle of the object.

The above information processing device comprises a plurality of light transmission/reception units and an information processing unit. The light transmission/reception units are arranged at a first position on a vehicle and a second position different from the first position on the vehicle. Each of the light transmission/reception units includes (i) an emission unit configured to emit a light, (ii) a scanning unit configured to scan the light emitted by the emission unit, and (iii) a light receiving unit configured to receive the light reflected by an object. The information processing unit performs synthesizing processing of synthesizing light receiving results of the light receiving units of the plurality of light transmission/reception units to obtain at least one of a distance to an object and an angle of the object. By this information processing device, it is possible to detect objects existing in the omnidirectional and horizontal direction by the plurality of scanning units and thereby obtain surrounding environment information.

EMBODIMENTS

Preferred embodiments of the present invention will be described below with reference to the attached drawings.

[Configuration]

FIG. 1 is a block diagram illustrating a Lidar unit to which an information processing device according to the present invention is applied. The Lidar unit 100 shown in FIG. 1 is a Lidar (Light Detection and Ranging, or Laser Illuminated Detection And Ranging) of TOF (Time Of Flight) system, and measures a distance to an object in an omnidirectional and horizontal direction. The Lidar unit 100 is used for the purpose of assisting recognition of surrounding environment of a vehicle as a part of an advanced driving support system. The Lidar unit 100 mainly includes scanning units L1 to L4, light transmission/reception units TR1 to TR4 and a signal processing unit SP. In the following description, each of the scanning units L1 to L4 is simply referred to as "the scanning unit L" if the respective ones of the scanning units L1 to L4 are not discriminated from each other, and each of the light transmission/reception units TR1 to TR4 is simply referred to as "the light transmission/reception unit TR" if the respective ones of the light transmission/reception units TR1 to TR4 are not discriminated from each other.

Figure 2B:
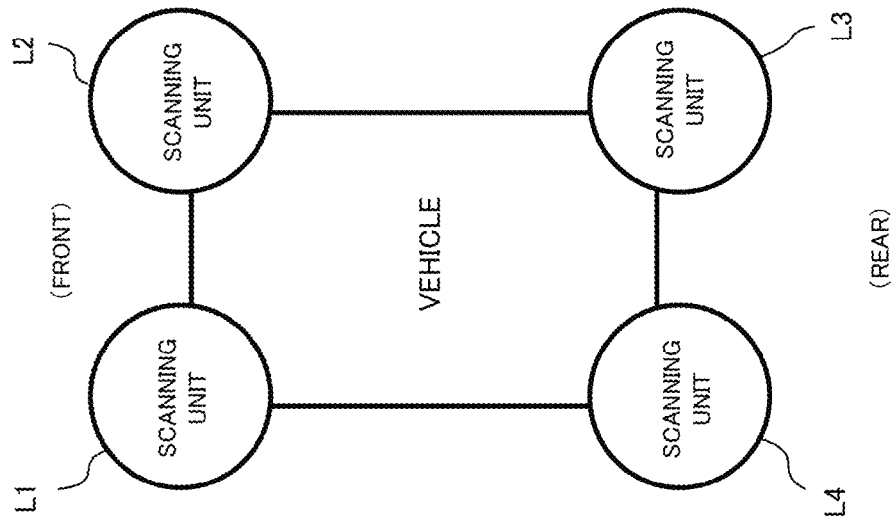
FIGS. 2A and 2B illustrate positions of scanning units arranged on a vehicle.
Figure 2A:
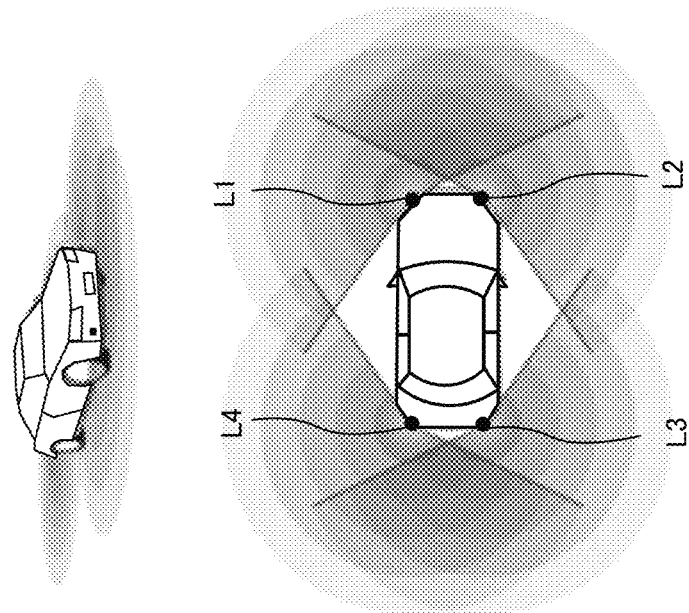

The scanning units L1 to L4 are arranged at four positions, i.e. at the front, rear, left and right positions of the vehicle, respectively. FIGS. 2A and 2B illustrate a vehicle on which the scanning units L1 to L4 are arranged. As shown in FIGS. 2A and 2B, the scanning units L1 to L4 are provided at four corners of front, rear, left and right of the vehicle. As shown in FIG. 2A, the scanning units L1 to L4 emit the laser pulses (hereinafter also referred to as "transmission light pulses") in an omnidirection (360°), respectively. Preferably, the scanning units L1 and L2 arranged on the front side of the vehicle are provided in the headlight units of the vehicle, and the scanning units L3 and L4 arranged on the rear side of the vehicle are provided in taillight units of the vehicle. Instead, the scanning units L1 to L4 may be provided in the units of other lights at the front and rear side of the vehicle.

Since the scanning units L1 to L4 are provided at the four positions of the front, rear, left and right of the vehicle, respectively, the transmission light pulses emitted by each of the scanning unit L are partly blocked by the vehicle itself (by the body of the vehicle). For example, out of the transmission light pulse L1 omnidirectionally emitted by the scanning unit L1 at the front side of the vehicle, a part of the transmission light pulse L1 on the rear side of the vehicle is blocked by the body of the vehicle. Namely, the transmission light pulses omnidirectionally emitted by the scanning units L1 to L4 actually have a dead angle of some degrees formed by the body of the vehicle, respectively.

The light transmission/reception unit TR emits the transmission light pulses in the 360° omnidirection in the horizontal direction with gradually changing the emission direction. At that time, the light transmission/reception unit TR emits the transmission light pulse at each of segments (900 segments in this embodiment) obtained by dividing the omnidirection, i.e., 360° in the horizontal direction by equal angles. Then, the light transmission/reception unit TR generates a signal (hereinafter referred to as "a segment signal Sseg") associated with a light reception intensity at each segment, by receiving the reflected lights (hereinafter referred to as "reception light pulses") of the transmission light pulses within a predetermined time period after emitting the transmission light pulses, and outputs the segment signal Sseg to the signal processing unit SP.

The signal processing unit SP outputs surrounding environment information, including at least one of a distance to the object and an angle of the object, based on the segment signals Sseg at each segment received from the light transmission/reception unit TR. The surrounding environment information indicates surrounding environment of the vehicle on which the Lidar unit 100 is installed, and specifically indicates the distance and the angle of the object existing in the omnidirection around the vehicle.

Figure 3:
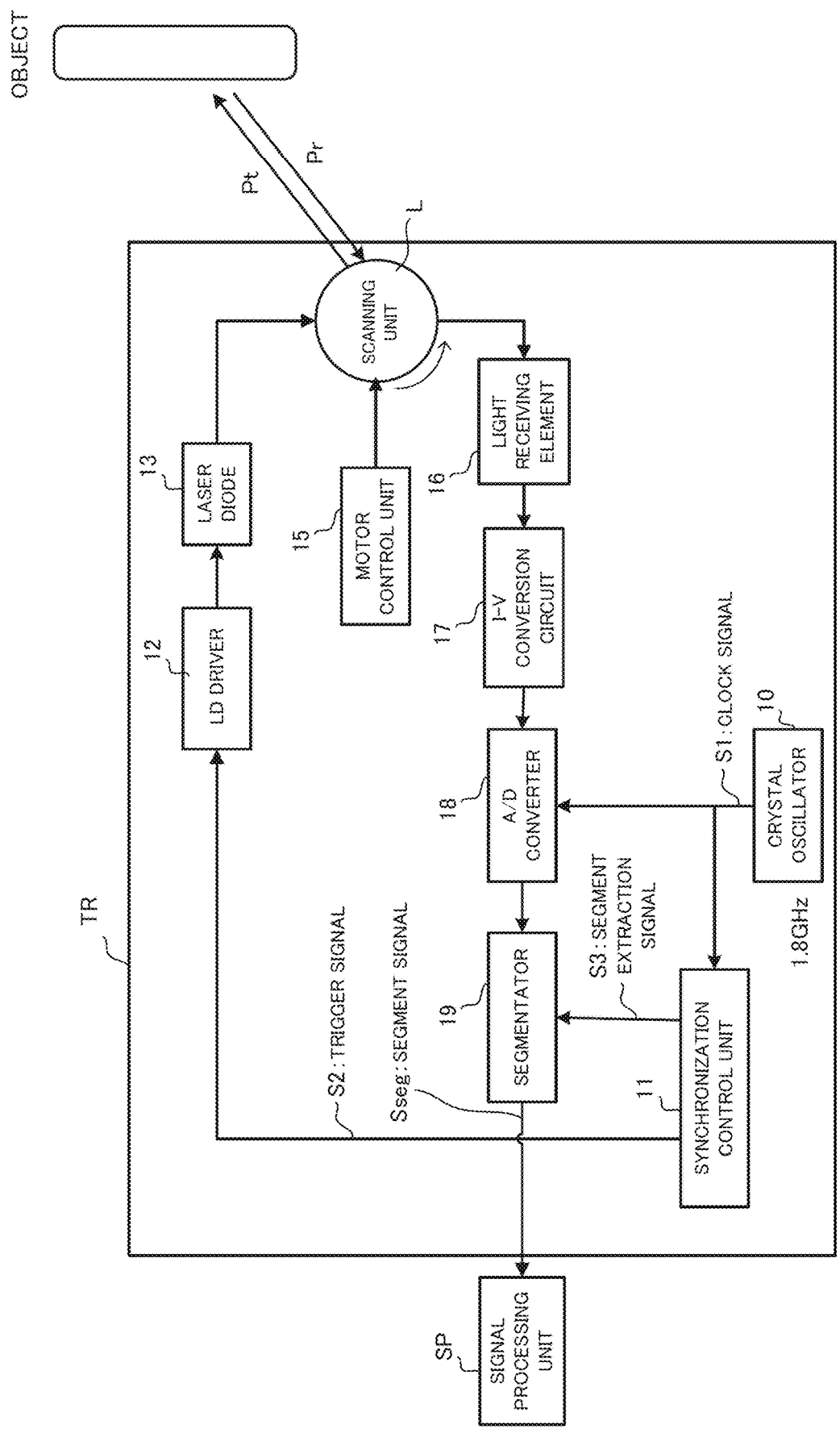
FIG. 3 is a block diagram illustrating a configuration of a light transmission/reception unit.

FIG. 3 illustrates a schematic configuration of the light transmission/reception unit TR. As shown in FIG. 3, the light transmission/reception unit TR mainly includes a crystal oscillator 10, a synchronization control unit 11, an LD driver 12, a laser diode 13, a motor control unit 15, a light receiving element 16, a current-voltage converting circuit (a trans-impedance amplifier) 17, an A/D converter 18 and a segmentator 19.

The crystal oscillator 10 outputs a pulse-type clock signal S1 to the synchronization control unit 11 and the A/D converter 18. In this embodiment, as an example, the clock frequency is 1.8 GHz. In the following description, the clocks of the clock signal S1 is referred to as "sample clocks".

Figure 4:
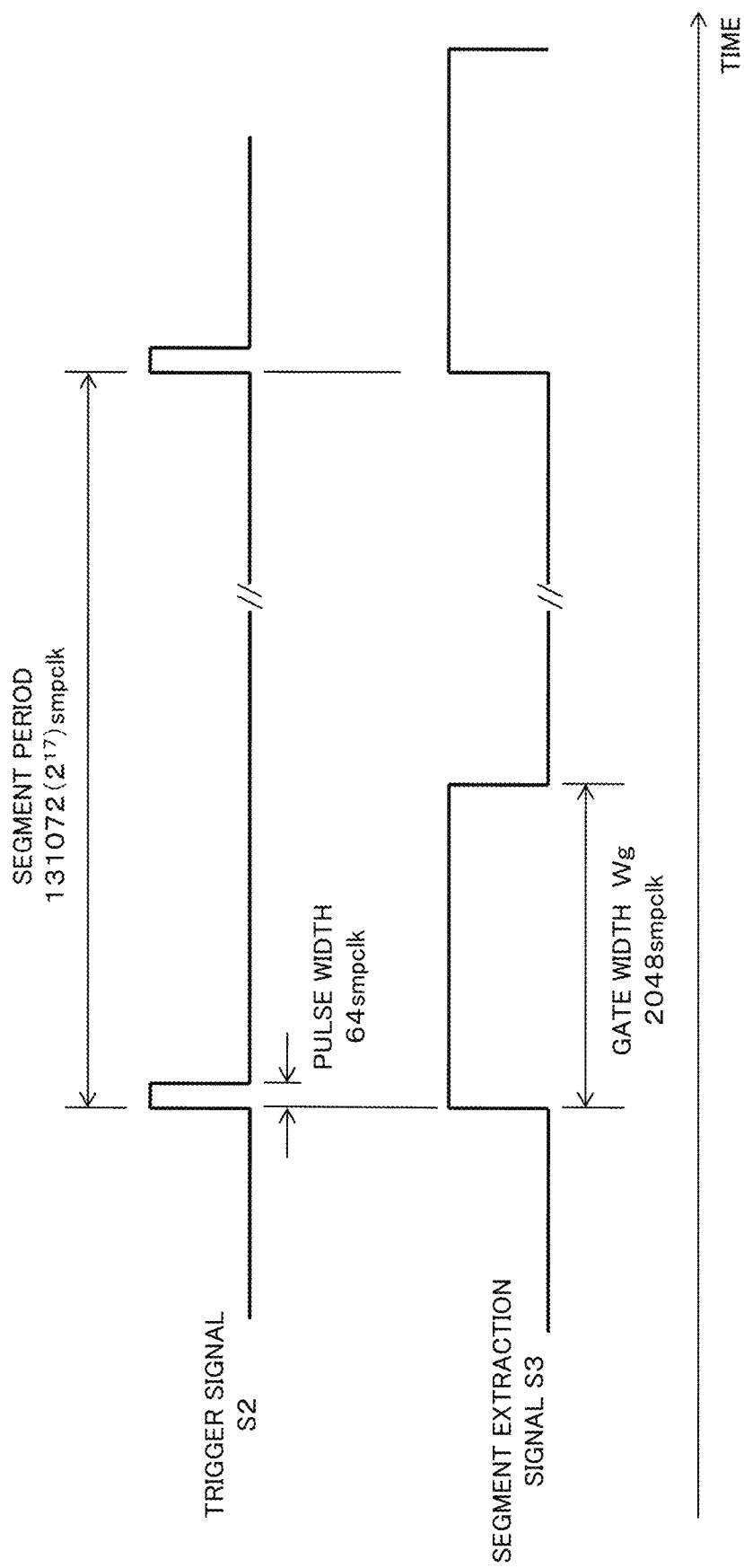
FIG. 4 illustrates waveforms of a trigger signal and a segment extraction signal.

The synchronization control unit 11 outputs a pulse-type signal (hereinafter referred to as "a trigger signal S2") to the LD driver 12. In this embodiment, the trigger signal S2 is periodically asserted by the period of 131072(=$2^{17}$) sample clocks. In the following description, the time period from the time when the trigger signal S2 is asserted to the time when the trigger signal S2 is asserted next time is referred to as "a segment period". Also, the synchronization control unit 11 outputs, to the segmentator 19, a signal (hereinafter referred to as "a segment extracting signal S3") determining the timing at which the segmentator 19 described later extracts the output of the A/D converter 18. The trigger signal S2 and the segment extracting signal S3 are logic signals, and are synchronized with each other as shown in FIG. 4 described later. In this embodiment, the synchronization control unit 11 asserts the segment extracting signal S3 for the time width (referred to as "a gate width Wg") of 2048 sample clocks.

The LD driver 12 applies the pulse current to the laser diode 13 in synchronization with the trigger signal S2 inputted from the synchronization control unit 11. The laser diode 13 is an infrared (905 nm) pulse laser for example, and emits the light pulses based on the pulse current supplied from the LD driver 12. In this embodiment, the laser diode 13 emits the light pulses of approximately 5 nsec.

The scanning unit L, configured as a scanner including transmission and reception optical systems for example, scans the transmission light pulses emitted by the laser diode 13 360° in the horizontal plane and guides, to the light receiving element 16, the reception light pulses that are return lights reflected by an object (also referred to as "target") to which the emitted transmission light pulses are irradiated. In this embodiment, the scanning unit L includes a motor for rotation, and the motor is controlled by the motor control unit 15 to make one rotation with 900 segments. The angular resolution in this case is 0.4° (=360°/900) per segment.

The light receiving element 16 is an avalanche diode for example, and generates a weak current corresponding to the reflected light guided by the scanning unit L, i.e., the light quantity of the reception light pulse Pr. The light receiving element 16 supplies the generated weak current to the current-voltage converting circuit 17. The current-voltage converting circuit 17 amplifies the weak current supplied from the light receiving element 16 and converts it to a voltage signal, and inputs the converted voltage signal to the A/D converter 18.

The A/D converter 18 converts the voltage signal supplied from the current-voltage converting circuit 17 to a digital signal based on the clock signal S1 supplied from the crystal oscillator 10, and supplies the converted digital signal to the segmentator 19. In the following description, the digital signal that the A/D converter 18 generates every one clock will be referred to as "a sample". One sample corresponds to data of one pixel in a frame in a polar coordinate space.

The segmentator 19 generates the digital signal outputted by the A/D converter 18 during 2048 sample clocks in the period of the gate width Wg, during which the segment extracting signal S3 is being asserted, as the segment signal Sseg. The segmentator 19 supplies the generated segment signal Sseg to the signal processing unit SP.

FIG. 4 illustrates waveforms of the trigger signal S2 and the segment extracting signal S3 in time series. As illustrated in FIG. 4, in this embodiment, the segment period, which is a one-cycle period of asserting the trigger signal S2, is set to the length of 131072 sample clocks (shown as "smpclk" in FIG. 3). The pulse width of the trigger signal S2 is set to the length of 64 sample clocks, and the gate width Wg is set to the length of 2048 sample clocks.

In this case, since the segment extracting signal S3 is asserted for the time period of the gate width Wg after the trigger signal S2 is asserted, the segmentator 19 extracts 2048 samples outputted by the A/D converter 18 while the trigger signal S2 is asserted. As the gate width Wg becomes longer, the maximum measurement distance (limit measurement distance) from the Lidar unit 100 becomes longer.

In this embodiment, the frequency of the segment period is approximately 13.73 kHz ($\approx$1.8 GHz/131072). Since one frame is constituted by 900 segments, the frame frequency of the frame in the polar coordinate space that the signal processing unit SP generates based on the segment signal Sseg is approximately 15.36 Hz ($\approx$13.73 kHz/900). Also, by a simple calculation, the maximum measurement distance is 170.55 m ($\approx$\{2048/1.8 GHz\}·c/2; "c" is a velocity of light) corresponding to a distance that a light goes and returns in a time width corresponding to the gate width Wg.

In the above configuration, the laser diode 13 is an example of "the emission unit" according to the present invention, and the light receiving element 16, the current-voltage conversion circuit 17 and the A/D converter 18 are examples of "the light receiving unit" according to the present invention. Also, the signal processing unit SP is an example of "the information processing unit" according to the present invention.

[Operation]

Next, the operation of the Lidar unit 100 will be described.

1st Embodiment

Figure 5:
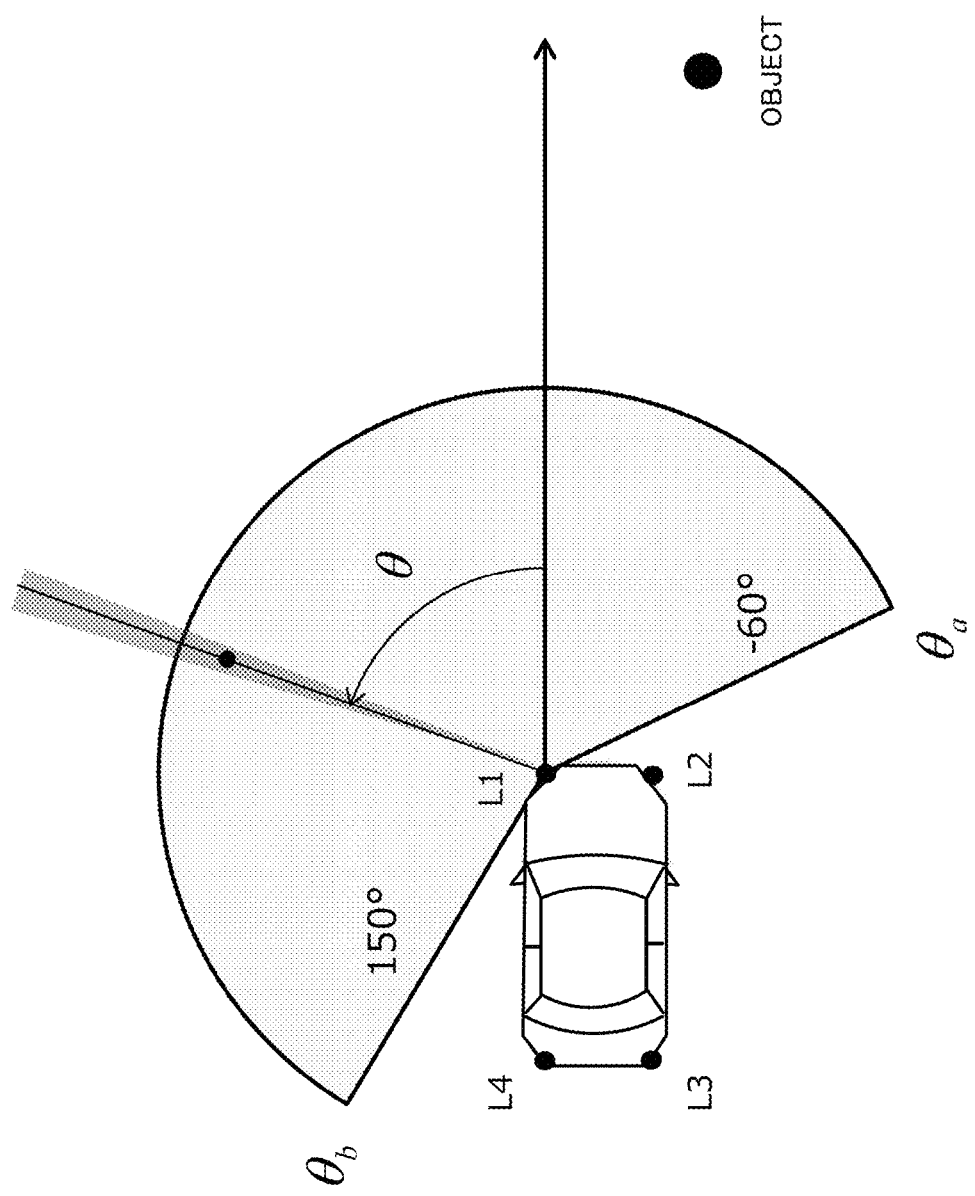
FIG. 5 illustrates a manner of scanning by a scanning unit according to a first embodiment.

FIG. 5 is a plan view illustrating an operation of the scanning unit L1 according to a first embodiment. Assuming that the travelling direction of a vehicle is $\theta_1$=0, the scanning unit L1 has a horizontal viewing angle range of 210° from $\theta_a$=−60° to $\theta_b$=150° as illustrated. Meanwhile, the scanning unit L1 has a dead angle by the vehicle body in the ranges 150°<$\theta_1$<180° and −180°<$\theta_1$<−60°. The scanning unit L1 scans the transmission light pulses in this horizontal viewing angle range, receives the light reflected by the object as the reception light pulses and supplies the reception light pulses to the light transmission/reception unit TR1.

Figure 6:
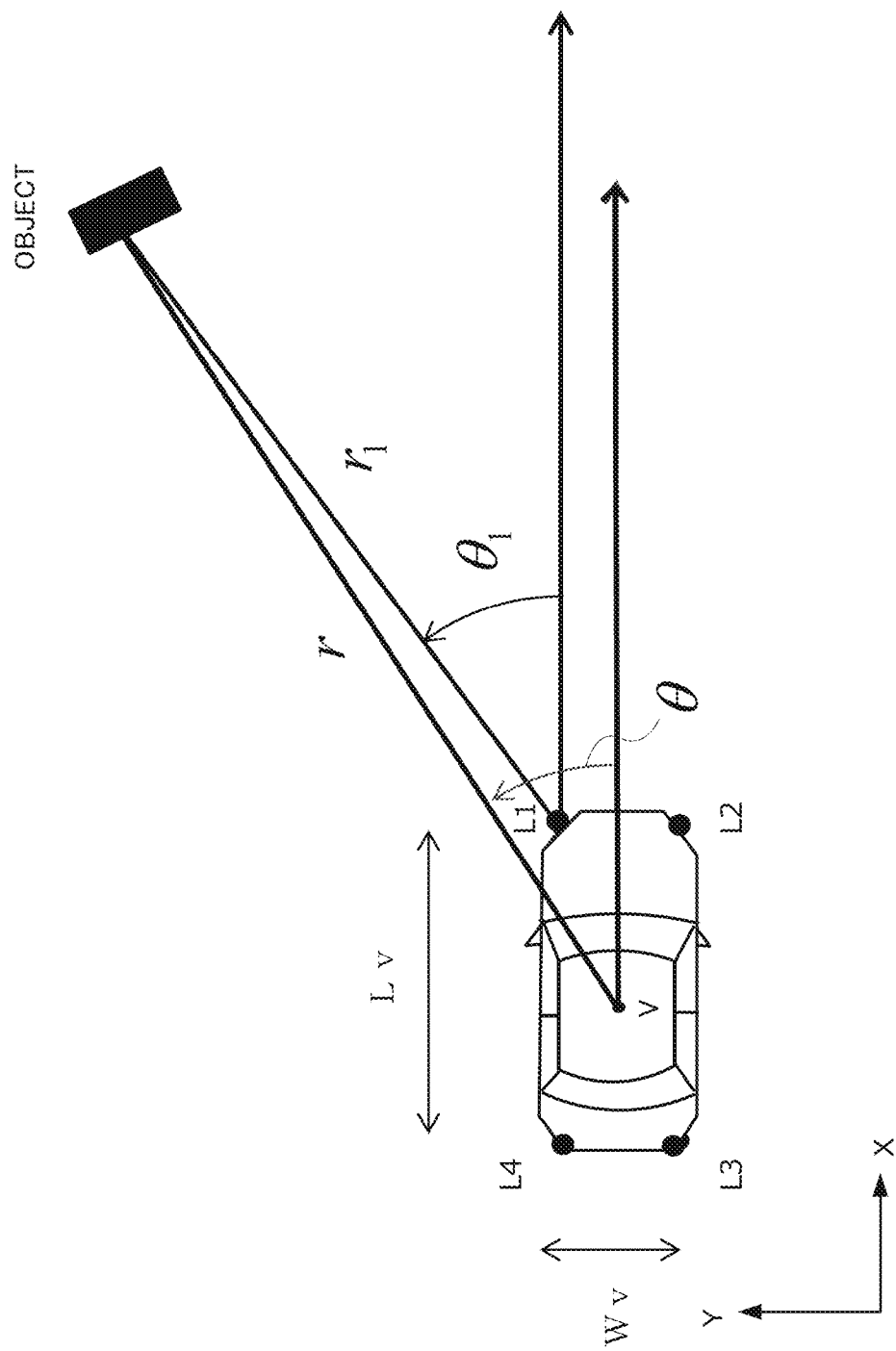
FIG. 6 illustrates a positional relation between an r1θ1 coordinate system and an rθcoordinate system.

FIG. 6 illustrates a positional relation between a polar coordinate system having the position of the scanning unit L1 as its origin and another polar coordinate system having the position of the center of the vehicle as its origin. The polar coordinate system having the position of the scanning unit L1 (hereinafter referred to as "center L1") as its origin is defined by the scanning angle "$\theta_1$" and the distance "$r_1$", and it is called as "r1θ1 coordinate system". Based on the segment signal Sseg supplied from the light transmission/reception unit TR1, the signal processing unit SP generates a group of digital waveforms (hereinafter referred to as "full-frame signal") in the r1θ1 coordinate frame having the position of the scanning unit L1 as its origin. The range of the scanning angle $\theta_1$ of the full-frame signal is −60°<$\theta_1$<150°. It is noted that the frame generated in the r1θ1 coordinate system is referred to as "r1θ1 coordinate frame". In contrast, the polar coordinate system having the center V of the vehicle as its origin is defined by the scanning angle "θ" and the distance "r", and it is called as "rθ coordinate system". Also, the frame generated in the rθ coordinate system is referred to as "rθ coordinate frame".

As illustrated in FIG. 6, assuming that the scanning units L1-L4 are arranged at four corners of the vehicle, the length of the vehicle is "Lv" and the width of the vehicle is "Wv", the origins of the rθ coordinate frame and the r1θ1 coordinate frame are shifted from each other by Lv/2 in the X-direction and Wv/2 in the Y-direction in FIG. 6. Therefore, those coordinate systems obviously do not indicate coordinates in the same XY space. However, as the distance "r" becomes far, the shift between those coordinate systems becomes relatively small.

In this embodiment, the signal processing unit SP converts the signal obtained by the scanning unit L1, i.e., the signal sampled in the r1θ1 coordinate frame to the signal sampled in the rθ coordinate frame by appropriate resampling processing. Namely, coordinate conversion from the r1θ1 coordinate frame to the rθ coordinate frame is performed. In this case, as the distance "r" becomes short, distortion of the distance "r" and the scanning angle "θ" caused by the conversion becomes large.

Figure 7:
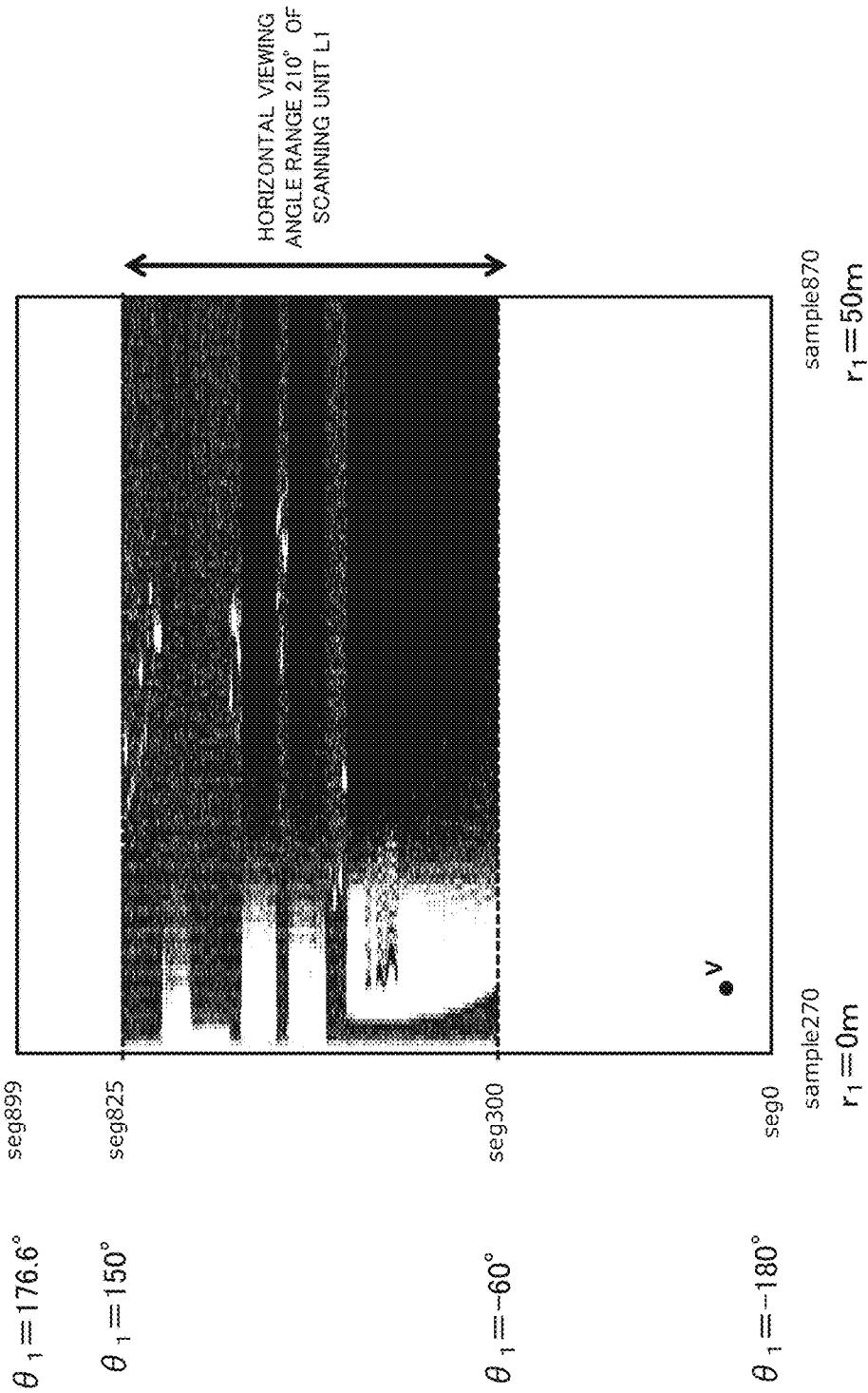
FIG. 7 illustrates a group of received waveforms of the scanning unit obtained in the r1θ1 coordinate system.

FIG. 7 illustrates an example of a received waveform group (full-frame signal) of the scanning unit L1 obtained in the r1θ1 coordinate system. The horizontal axis indicates a distance $r_1$ from the origin, i.e., the center L1, which ranges in 0 to 50 m in this example. The vertical axis indicates the scanning angle $θ_1$ which substantially ranges −180° to 180°. Since the scanning unit L1 scans the horizontal viewing angle range of 210° from −60° to 150° as shown in FIG. 5, the full-frame signal of the horizontal viewing angle range of 210° from −60° to 150° can be obtained from the signal processing unit SP based on the scanning by the scanning unit L1 as shown in FIG. 7.

Figure 8A:
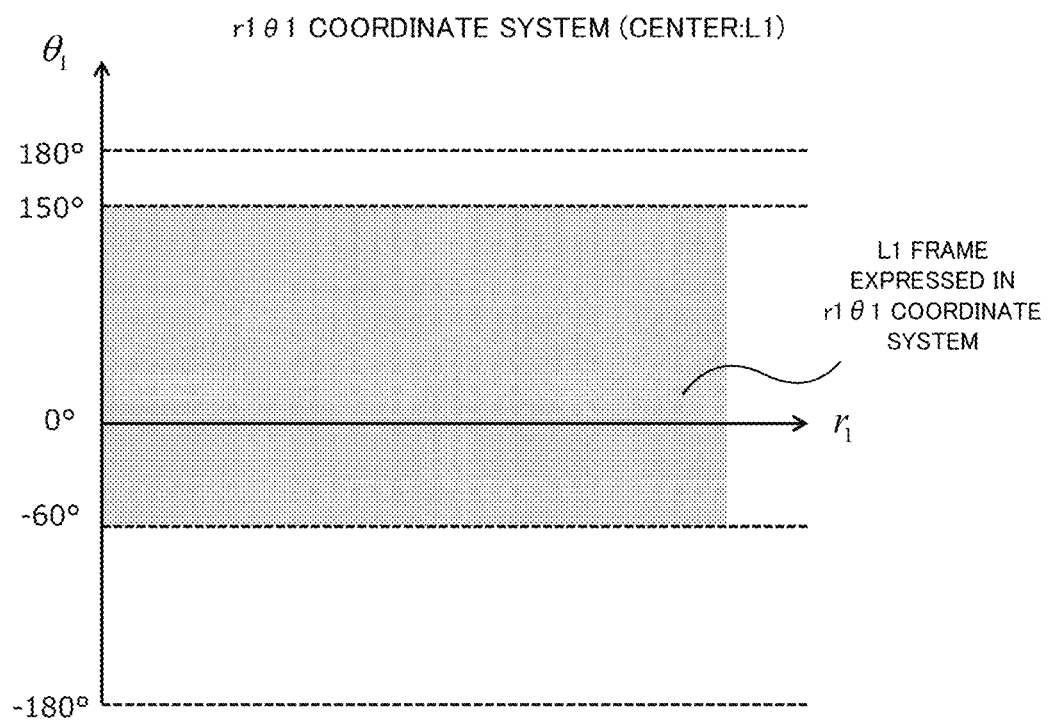
FIGS. 8A and 8B illustrate a range of an L1 frame in the r1θ1 coordinate system and the rθ coordinate system.
Figure 8B:
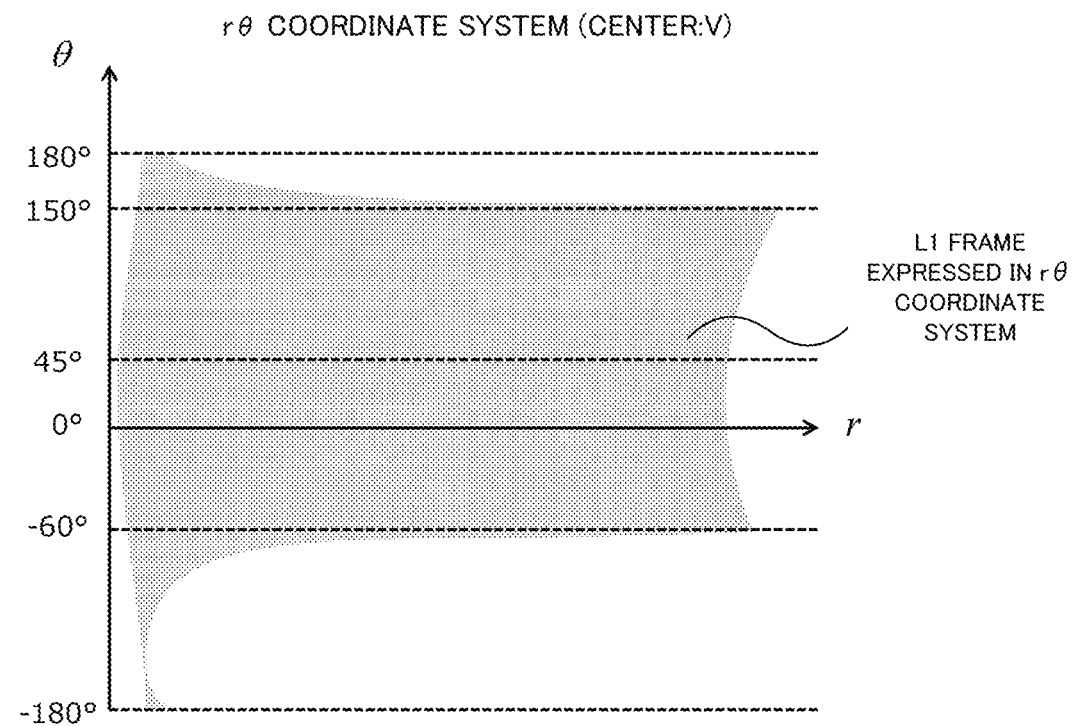

FIG. 8A illustrates the range of the r1θ1 coordinate frame in the r1θ1 coordinate system. Since the scanning unit L1 scans the horizontal viewing angle range of 210° from −60° to 150°, the r1θ1 coordinate frame becomes the full-frame signal in the range from −60° to 150°. In contrast, FIG. 8B indicates the r1θ1 coordinate frame shown in FIG. 8A in the rθ coordinate system, and it is the full-frame signal in the range approximately from −60° to 150°.

Figure 9A:
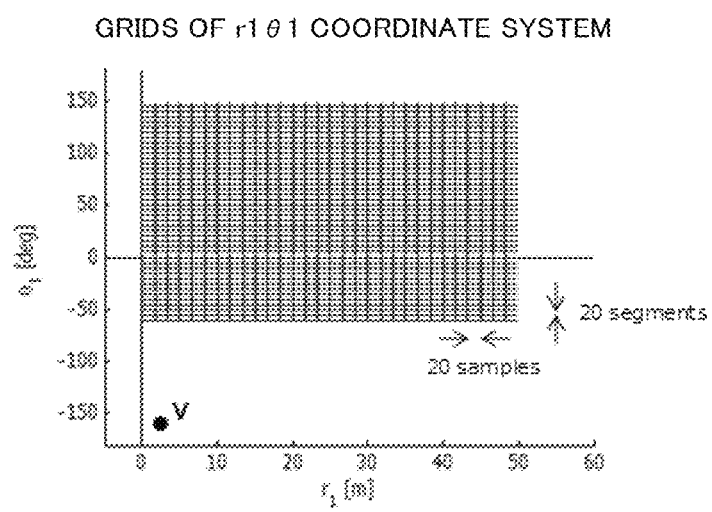
FIGS. 9A and 9B illustrate a conversion from an r1θ1 coordinate frame to an rθ coordinate frame.
Figure 9B:
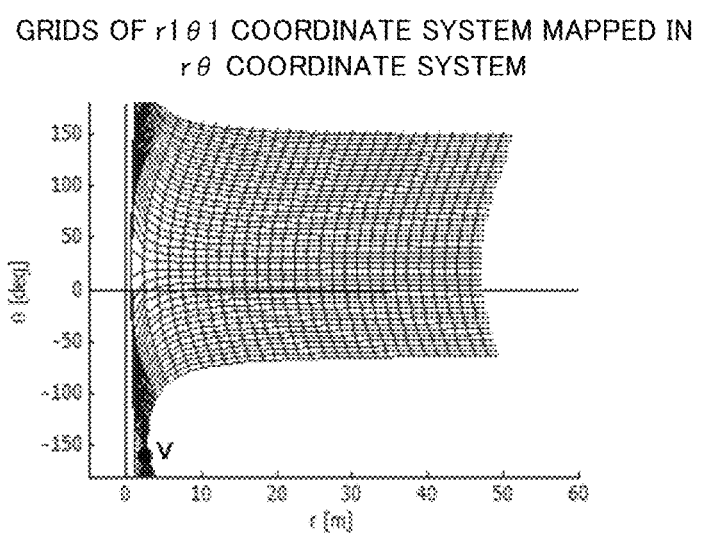

FIGS. 9A and 9B illustrate conversion from the r1θ1 coordinate frame to the rθ coordinate frame. When the grids of the r1θ1 coordinate frame is mapped to the rθ coordinate frame, the grids shown in FIG. 9B are obtained. In the following description, the r1θ1 coordinate frame obtained by the scanning by the scanning unit L1 will be simply referred to as "L1 frame". Similarly, the r2θ2 coordinate frame obtained by the scanning by the scanning unit L2 will be referred to as "L2 frame", the r3θ3 coordinate frame obtained by the scanning by the scanning unit L3 will be referred to as "L3 frame", and the r4θ4 coordinate frame obtained by the scanning by the scanning unit L4 will be referred to as "L4 frame".

Figure 10C:
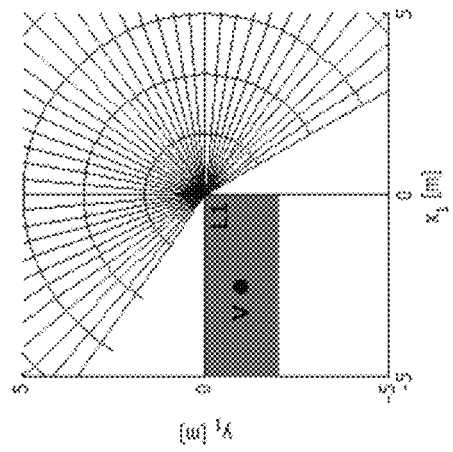
FIGS. 10A to 10D illustrate a conversion from an x1y1 coordinate frame to an xy coordinate frame.
Figure 10D:
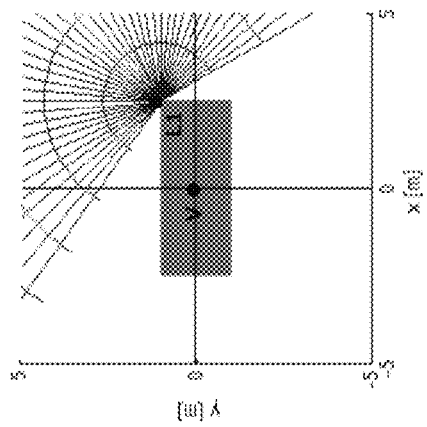
Figure 10A:
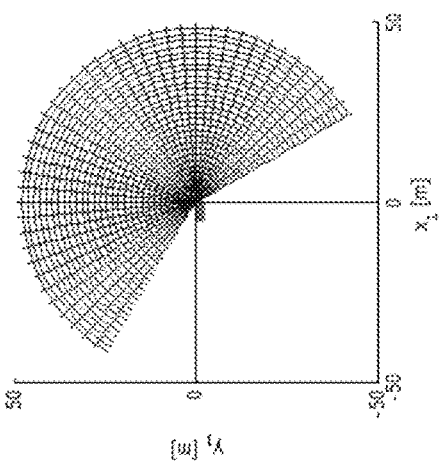
Figure 10B:
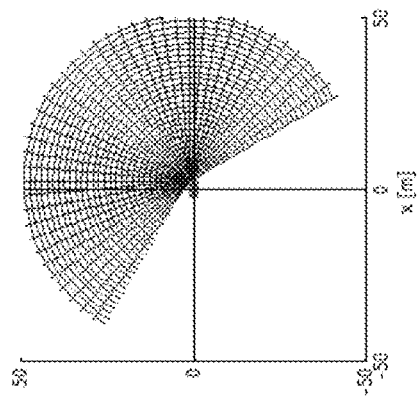

FIGS. 10A to 10D indicate conversion from the x1y1 coordinate frame to the xy coordinate frame. It is noted that "the x1y1 coordinate frame" is a frame generated in the xy coordinate system having the position of the scanning unit L1 as its origin, and "the xy coordinate frame" is a frame generated in the xy coordinate system having the vehicle center V as its origin. When the grids in the x1y1 coordinate frame shown in FIG. 10A is mapped to the xy coordinate frame, the grids shown in FIG. 10B are obtained. FIG. 10C is an enlarged view of the portion around the position of the scanning unit L1 in FIG. 10A, and FIG. 10D is an enlarged view of the portion around the vehicle center V in FIG. 10B.

The signal processing unit SP converts the full-frame signals of the L2-L4 frames generated by the scanning units L2-L4 to the full-frame signals of the rθ coordinate frame in the same manner. Specifically, the full-frame signal of the L2 frame ranges $-150°<θ_2<60°$, the full-frame signal of the L3 frame ranges $120°<θ_3<180°$ and $-180°<θ_3<-30°$, and the full-frame signal of the L4 frame ranges $30°<θ_4<180°$ and $-180°<θ_4<-120°$. Then, the signal processing unit SP performs synthesizing processing of synthesizing the full-frame signals of the L1-L4 frames. It is noted that "the synthesizing processing" is a processing of adding the full-frame signal of each frame to produce omnidirectional data. By the synthesizing processing, the omnidirectional full-frame signal (hereinafter also referred to as "synthesized signal") can be generated from the full-frame signals separately obtained by the scanning of the scanning units L1-L4.

Figure 11:
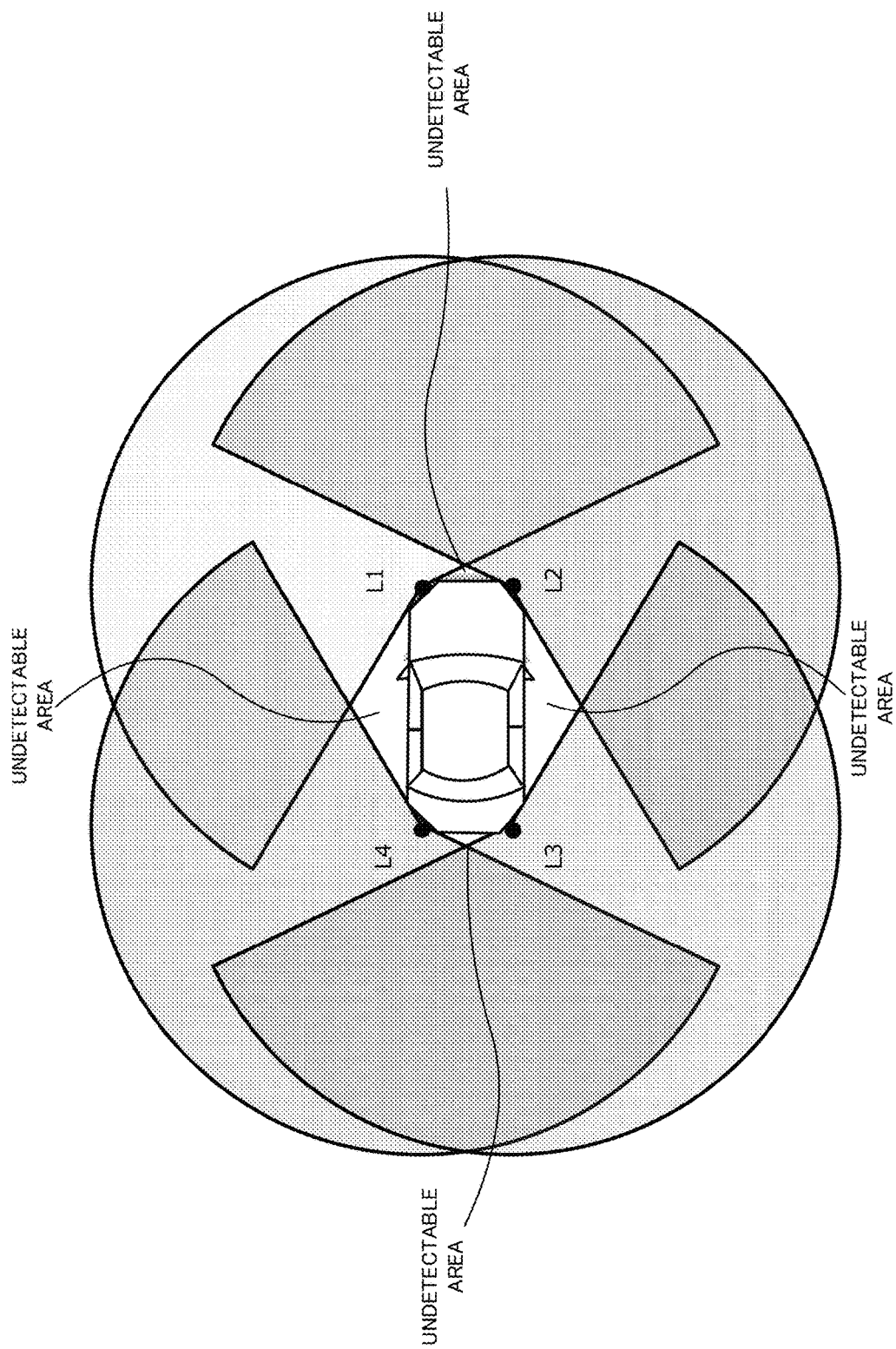
FIG. 11 illustrates scanning areas of a plurality of scanning units in the first embodiment.
Figure 12:
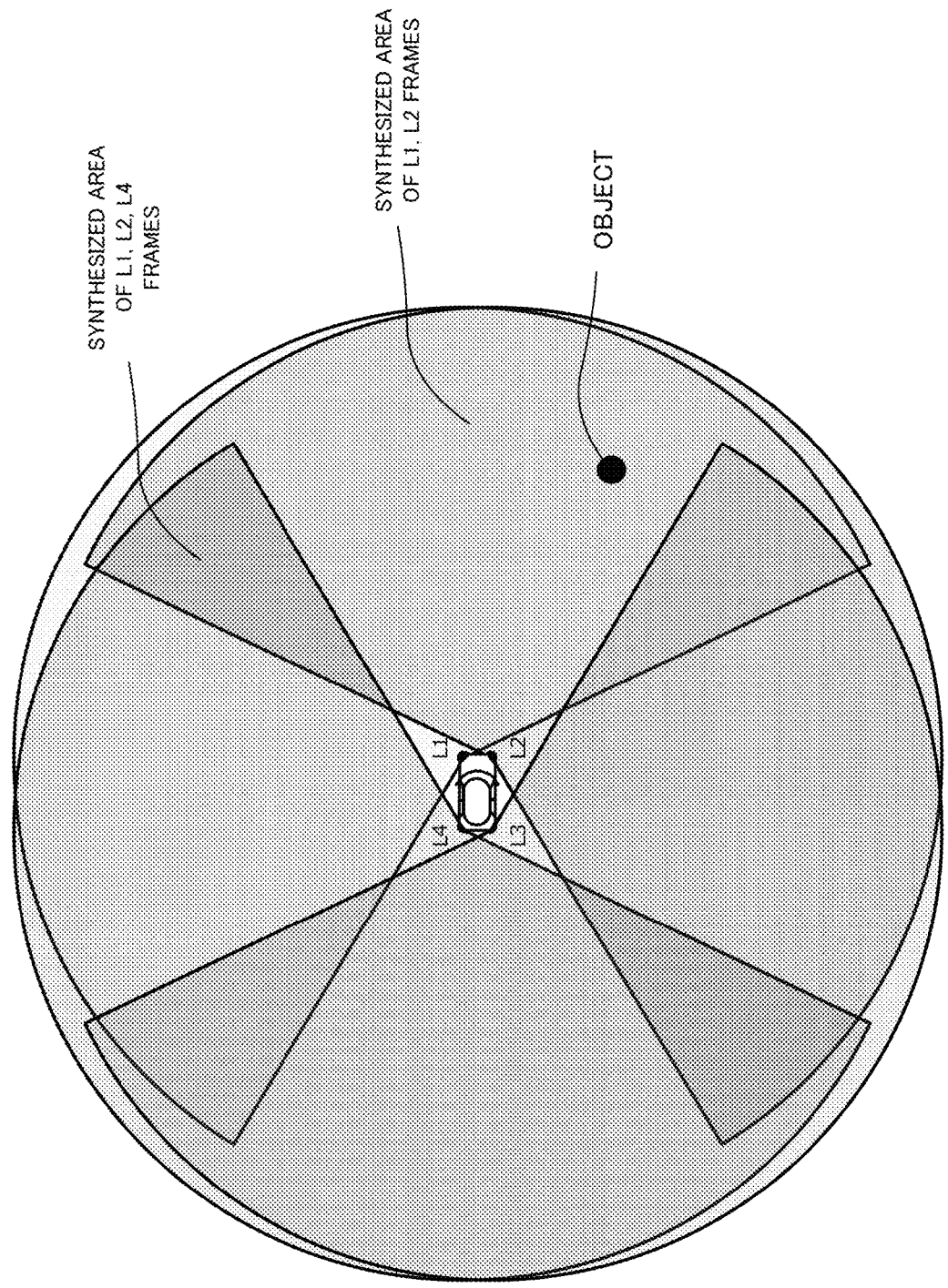
FIG. 12 illustrates scanning areas of the plurality of scanning units in the first embodiment.

FIG. 11 illustrates a condition where the full-frame signals of the L1-L4 frames are synthesized. In close proximity of the vehicle, there are undetectable areas which are not covered by the L1-L4 frames. FIG. 12 schematically illustrates a condition where the full-frame signals of the L1-L4 frames are synthesized for the area farther than FIG. 11 (i.e., the distance "r" is larger). As illustrated, there are synthesized areas of two frames and synthesized areas of three frames.

Figure 13:
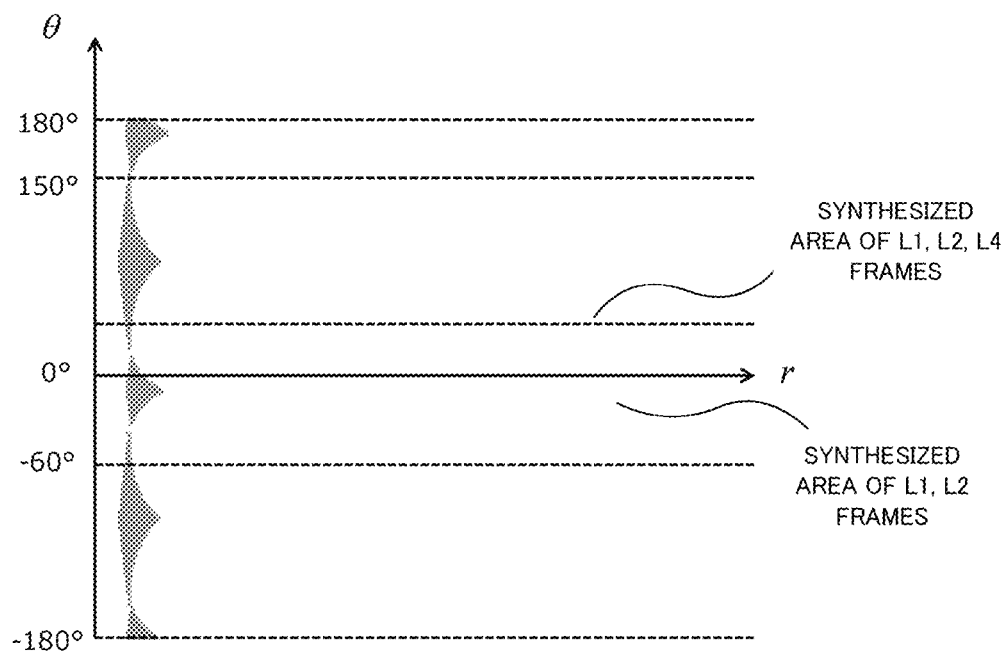
FIG. 13 illustrates a synthesized signal of L1-L4 frames obtained by synthesizing processing.

FIG. 13 illustrates the synthesized signal obtained by the synthesizing processing in the rθ coordinate system. The synthesized signal includes the synthesized areas of two frames and the synthesized areas of three frames. For the synthesized area of plural frames, the signal processing unit SP performs averaging processing of averaging plural full-frame signals. Namely, the signal processing unit SP adds and averages the segment signals Sseg supplied from each of the light transmission/reception units TR. This can reduce noises separately generated on the light receiving elements 16 of the light transmission/reception units TR.

2nd Embodiment

Figure 14:
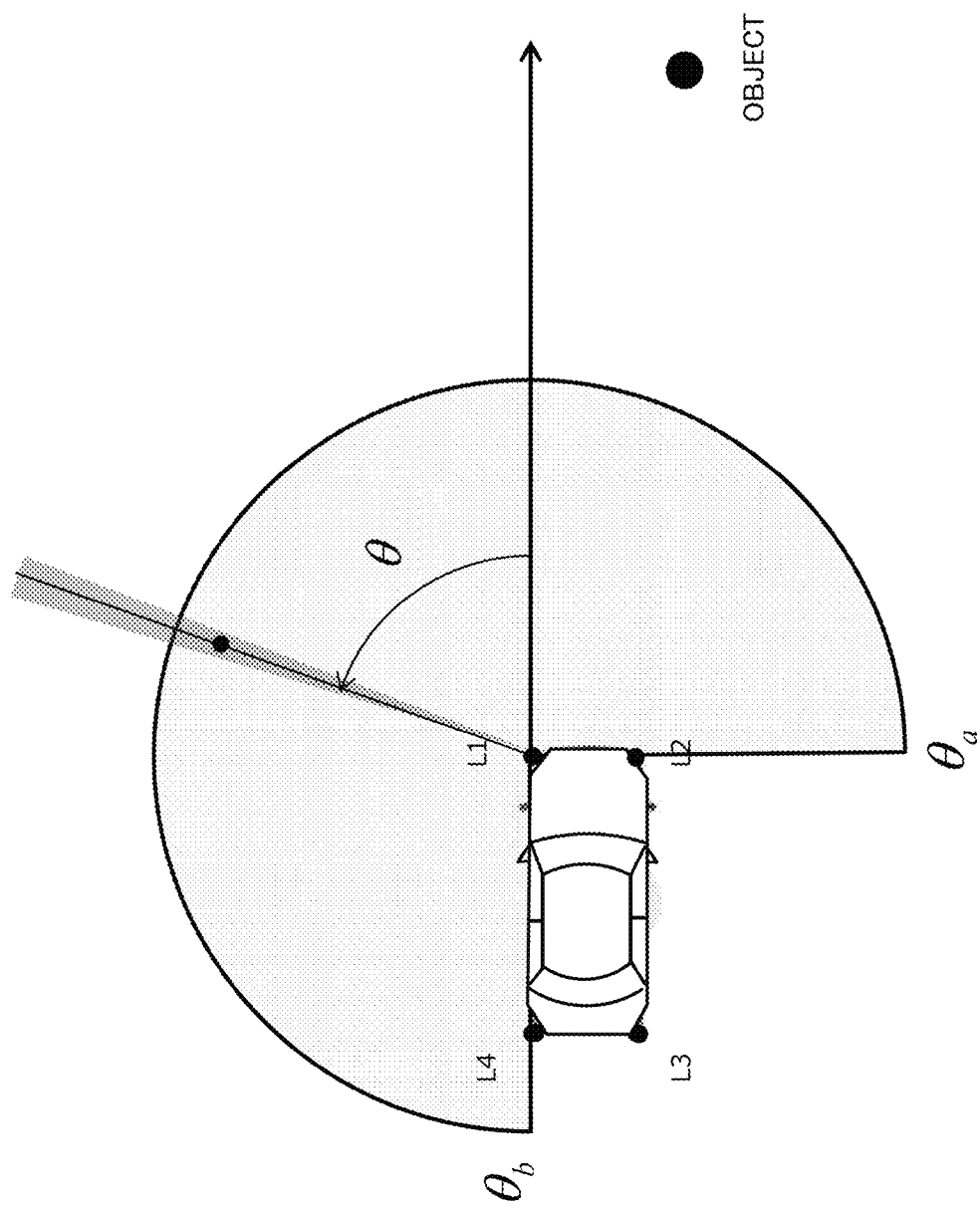
FIG. 14 illustrates a manner of scanning by a scanning unit according to a second embodiment.

FIG. 14 is a plan view illustrating an operation of the scanning unit L1 according to the second embodiment. Assuming that the travelling direction of the vehicle θ=0, the scanning unit L1 has the horizontal viewing angle range of 270° from $θ_a=-90°$ to $θ_b=180°$. On the other hand, the range $-180°<θ_1<-90°$ becomes a dead angle by the vehicle body. The signal processing unit SP obtains the full-frame signal of the L1 frame having this horizontal viewing angle.

The signal processing unit SP converts the full-frame signals of the L2-L4 frames generated by the scanning units L2-L4 to the full-frame signals of the rθ coordinate frame in the same manner. In the second embodiment, the full-frame signal of the L2 frame ranges $-180°<θ_2<90°$, the full-frame signal of the L3 frame ranges $90°<θ_3<180°$ and $-180°<θ_3<0°$, and the full-frame signal of the L4 frame ranges $0°<θ_4<270°$. Then, the signal processing unit SP performs the synthesizing processing of synthesizing the full-frame signals of the L1-L4 frames.

Figure 15:
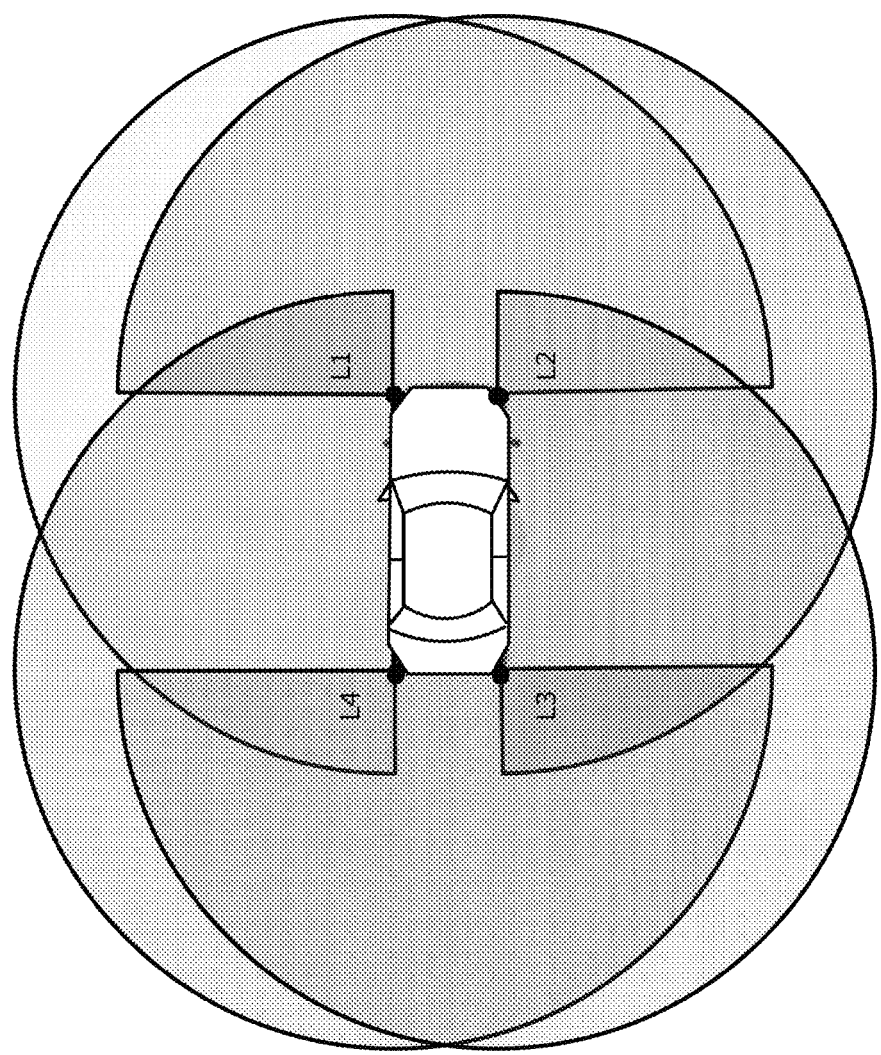
FIG. 15 illustrates scanning areas of a plurality of scanning units in the second embodiment.

FIG. 15 schematically illustrates the state where the full-frame signals of the L1-L4 frames are synthesized. As is understood in comparison with FIG. 11, there is no undetectable area near the vehicle in the second embodiment. FIG. 16 schematically illustrates the state where the full-frame signals of the L1-L4 frames in the farther range (the distance "r" is larger) are synthesized.

[Comparison with Prior Art]

Figure 17A:
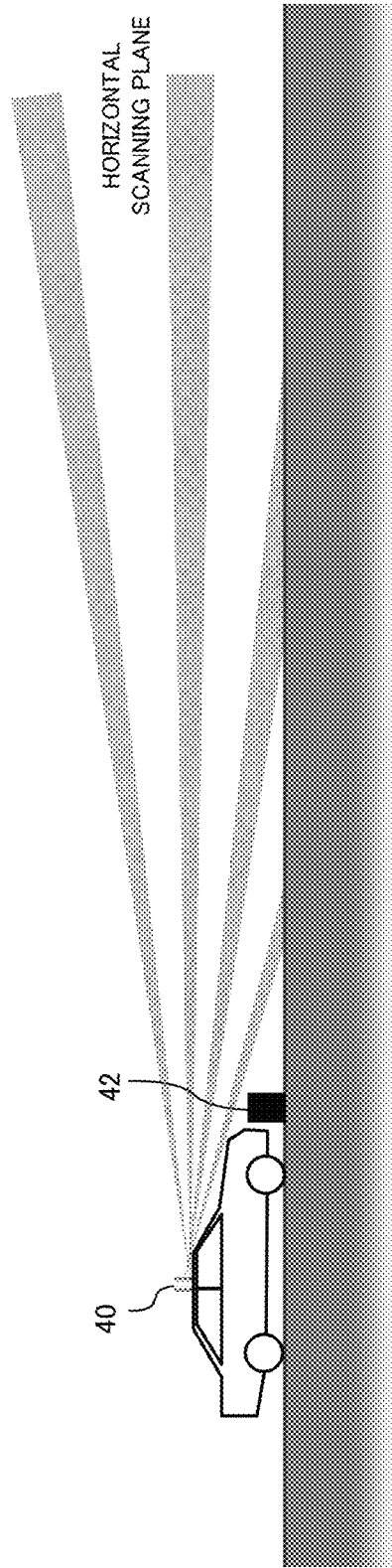
FIGS. 17A and 17B illustrate manners of detecting an object by a prior art.
Figure 17B:
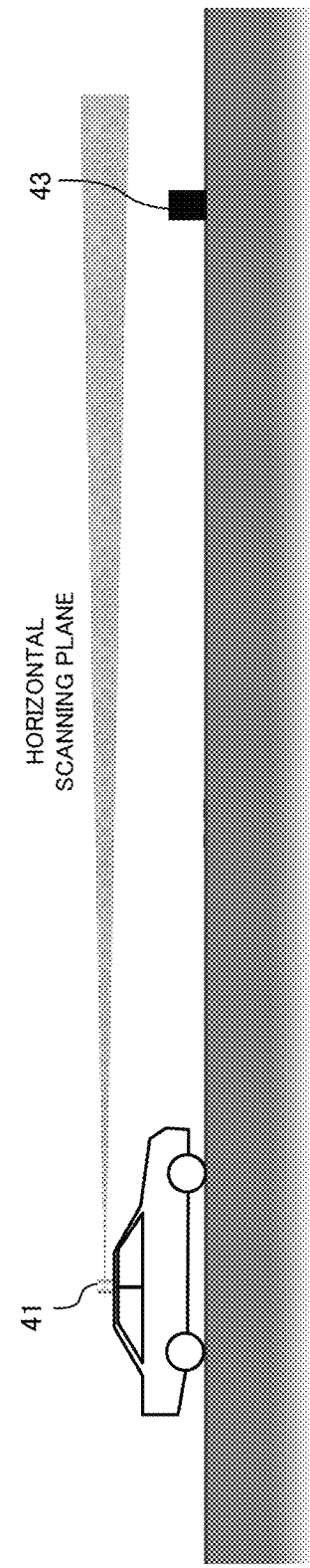

FIGS. 17A and 17B illustrate manners of detecting an object by a Lidar mounted on a roof of a vehicle. If a multi-layer Lidar 40 is mounted on the roof as shown in FIG. 17A, it is not possible to detect the object 42 located close to the vehicle and at the low position. Also, if a single-layer Lidar 41 is mounted on the roof of the vehicle as shown in FIG. 17B, it is not possible to detect the object 43 far from the vehicle and at the low position.

FIGS. 18A and 18B illustrates manners of detecting an object by a scanning unit L incorporated in a light unit of a vehicle like the above-described embodiments. According to the embodiments, it is possible to detect the object 42 located close to the vehicle and at the low position by a single-layer Lidar as shown in FIG. 18A, and it is possible to detect the object 43 located far from the vehicle and at the low position as shown in FIG. 18B.

Next, Patent References 1 and 2 will be described. As disclosed in Patent Reference 1, a Lidar is generally mounted at a high position of a vehicle to obtain omnidirectional information. In that case, however, it is not possible to obtain information at the low position as shown in FIGS. 17A and 17B. On the other hand, while Patent Reference 2 discloses an example wherein laser radars are loaded in two headlight units of a vehicle, it is not possible to obtain information in all direction (mainly in a rear direction) due to the influence by the vehicle body.

Further, since the laser radars in Patent Reference 2 are aimed to detect obstacles existing ahead in order to avoid collision, there may occur no demand to obtain omnidirectional information. In other words, it is enough if information in the travelling direction can be obtained. In contrast, a Lidar can obtain much information than the laser radars used in Patent Reference 2, and the Lidar can recognize detailed shapes of surrounding ground objects for example. Therefore, since the Lidar can be used for updating map information, for example, other than the collision avoidance, there is a demand to obtain omnidirectional information.

It is presumed that the laser radars in Patent Reference 2 emit a wide-angle laser light in one direction and detect intensity of the retuned light to detect presence/absence of objects (returning lights), and does not have a component corresponding to a scanning unit. Therefore, it is presumed that the laser radars in Patent Reference 2 can measure a distance to an object, but cannot obtain information as to an angle of a specific object and/or information of point groups. It is presumed that each laser radar in Patent Reference 2 can do nothing more than independently detecting obstacles.

Modified Examples

While a single-layer Lidar including the scanning unit L and the light transmission/reception unit TR is provided at four corners of the vehicle in the above embodiments, multi-layer Lidars may be provided instead. FIGS. 19A and 19B illustrate manners of detecting an object in this case. It is possible to detect the object 42 located in a short distance and at the low position as shown in FIG. 19A, and it is also possible to detect the object 43 located in a far distance and at the low position as shown in FIG. 19B.

INDUSTRIAL APPLICABILITY

This invention can be used for a technique of obtaining surrounding environment information by emitting a laser light.

BRIEF DESCRIPTION OF REFERENCE NUMBERS

L1-L4 Scanning unit
TR1-TR4 Light transmission/reception unit
SP Signal processing unit
13 Laser diode
16 Light receiving element

The invention claimed is:

1. An information processing device comprising:

a plurality of light transmission/reception units, each being loaded on a vehicle and each including an emission unit configured to emit a light, a scanning unit configured to scan the light emitted by the emission unit through a scan range, and a light receiving unit configured to receive the light reflected by an object and generate a light receiving result comprising a light reception intensity for each light emission angle and distance of the entire scan range; and an information processing unit configured to convert each of the light receiving results of the light receiving units to converted information on a basis of a predetermined position of the vehicle, and performs synthesizing processing of synthesizing each of the converted information together into an omnidirectional signal, wherein each of the scanning units is arranged at a position where there is a direction in which the light scanned by the scanning unit is blocked by the vehicle itself.

2. The information processing device according to claim 1, wherein the information processing unit obtains at least one of a distance to the object and an angle with respect to the object from a result of the synthesizing processing.

3. The information processing device according to claim 2, wherein the information processing unit performs averaging processing of the light receiving results of the light receiving units of the plurality of light transmission/reception units for an overlapped range where scanning ranges of the plurality of light transmission/reception units overlap.

4. The information processing device according to claim 1, wherein a number of the plurality of light transmission/reception units is four, and wherein the plurality of light transmission/reception units are arranged in light units of the vehicle.

5. An information processing method executed by an information processing device comprising a plurality of light transmission/reception units, each being loaded on a vehicle and each including an emission unit, a scanning unit and a light receiving unit, the method comprising:

a transmission/reception process executing, by each of the plurality of light transmission/reception units, an emission process emitting a light from the emission unit, a scanning process scanning the light emitted by the emission unit through a scan range by the scanning unit, and a light receiving process receiving the light reflected by an object by the light receiving unit and generate a light receiving result comprising a light reception intensity for each light emission angle and distance of the entire scan range; and an information processing process converting each of the light receiving results of the light receiving units to converted information on a basis of a predetermined position of the vehicle, and performs synthesizing processing of synthesizing each of the converted information together into an omnidirectional signal, wherein each of the scanning units is arranged at a position where there is a direction in which the light scanned by the scanning unit is blocked by the vehicle itself.

6. A non-transitory computer-readable medium storing program executed by an information processing device comprising a plurality of light transmission/reception units, each being loaded on a vehicle and each including an emission unit, a scanning unit and a light receiving unit; and a computer, the program causing the computer to execute:
   a transmission/reception process executing, by each of the plurality of light transmission/reception unit, an emission process emitting a light from the emission unit, a scanning process scanning the light emitted by the emission unit through a scan range by the scanning unit, and a light receiving process receiving the light reflected by an object by the light receiving unit and generate a light receiving result comprising a light reception intensity for each light emission angle and distance of the entire scan range; and
   an information processing process converting each of the light receiving results of the light receiving units to converted information on a basis of a predetermined position of the vehicle, and performs synthesizing processing of synthesizing each of the converted information together into an omnidirectional signal,
   wherein each of the scanning units is arranged at a position where there is a direction in which the light scanned by the scanning unit is blocked by the vehicle itself.

7. The information processing device according to claim 1,
   wherein the light receiving results of each light transmission/reception unit constitute a full-frame signal,
   wherein converting each of the light receiving results of the light receiving units to converted information comprises coordinate conversion of each full-frame signal from a respective first coordinate frame to a second coordinate frame, each respective first coordinate frame having the respective light transmission/reception unit at an origin and the second coordinate frame having a center of the vehicle at the origin, and
   wherein performing synthesizing processing of synthesizing each of the converted information comprises adding together each of the converted full-frame signals to produce an omnidirectional full-frame signal.

* * * * *